Figure 1:
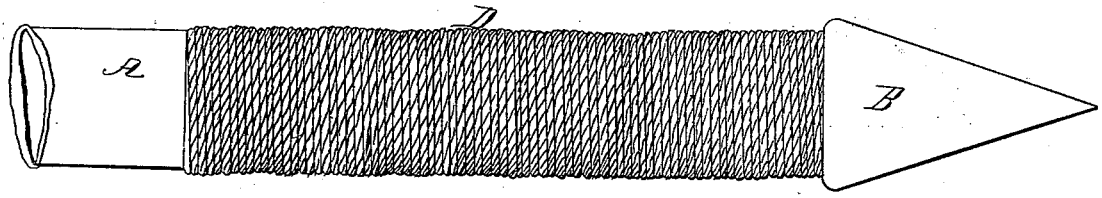
Figure 2:
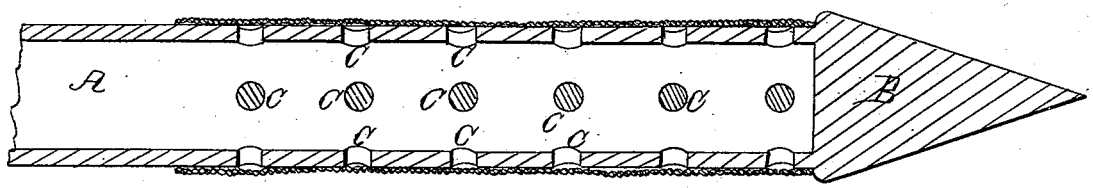

A. Y. McDonald,
Well Tubing,
No. 64,549. Patented May 7, 1867.

Witnesses.
P J Dodge

Inventor:
A. Y. McDonald
per
Alexander A Mason
Atty

United States Patent Office.

A. Y. McDONALD, OF DUBUQUE, IOWA.

Letters Patent No. 64,549, dated May 7, 1867.

---

IMPROVED WELL-TUBE.

---

The Schedule referred to in these Letters Patent and making part of the same.

---

TO ALL WHOM IT MAY CONCERN:

Be it known that I, A. Y. McDONALD, of Dubuque, in the county of Dubuque, and in the State of Iowa, have invented certain new and useful improvements in "Well-Tubes;" and I do hereby declare that the following is a full, clear, and exact description thereof, reference being had to the accompanying drawings, and to the letters of reference marked thereon.

In the annexed drawings, making part of this specification, A represents a well-tube, which is provided at its lower end with the pointed head B, and a little above this head with a series of perforations, C C C, which admit water to said tube. That portion of the tube which is provided with holes or perforations is wrapped with wire prepared as follows: I take a coarse article of brass, steel, or any other kind of wire which is suitable for the purpose, and wind around it (the coarse wire) a very fine wire, but do not wind it very closely. I then take this coarse wire and wind it around the tube A, over the perforations C in it, as closely as it can be wound. The fine wire keeps the coarse wire from touching when wound around, and allows a circulation of water through the coils of the coarse wire into the perforations, but does not allow sand to enter said perforations. When the pipe A is driven into the ground, and strikes a vein of water, the pure water runs into the pipe through the wire, while sand cannot enter to stop up and clog the pipe.

I am aware that gauze wire has been used for covering the perforations of pipes to prevent the entrance of sand and gravel, but in driving the pipe into the ground the gauze is liable to be torn off of the pipe and leave the perforations exposed. It is impossible with this construction for the wire to be removed from the pipe by driving it into the ground, and said pipe may be used with perfect certainty.

Having thus fully described my invention, what I claim as new, and desire to secure by Letters Patent, is—

The pipe A, perforated as described, and wrapped with the coarse wire after being first wound with the finer wire, in the manner substantially as and for the purposes specified.

In testimony that I claim the foregoing I have hereunto set my hand this 18th day of February, 1867.

A. Y. McDONALD.

Witnesses:
　DAVID J. POWER,
　GEORGE HEIN.